US008736661B2

(12) United States Patent
Koh et al.

(10) Patent No.: US 8,736,661 B2
(45) Date of Patent: May 27, 2014

(54) DEVICE INFORMATION INDEX AND RETRIEVAL SERVICE FOR SCALABLE VIDEO CONFERENCING

(75) Inventors: Eunyee Koh, San Ramon, CA (US); Thomas W. R. Jacobs, Cupertino, CA (US); Thomas Malloy, Portola Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 327 days.

(21) Appl. No.: 13/153,356

(22) Filed: Jun. 3, 2011

(65) Prior Publication Data

US 2013/0127979 A1 May 23, 2013

(51) Int. Cl.
H04N 7/14 (2006.01)

(52) U.S. Cl.
USPC .................. 348/14.08; 348/14.03; 348/14.05; 370/260; 379/202.01; 709/201; 709/204; 709/217

(58) Field of Classification Search
CPC ............ H04L 12/1818; H04L 12/2697; H04L 65/1043; H04L 65/1069; H04L 67/10; H04L 69/329; H04N 7/15; H04N 7/148; H04N 21/24; H04N 21/24435; H04M 3/567; H04M 7/0084; H04Q 2213/1324; H04Q 2213/13337; H04Q 3/0062; H04W 88/18
USPC .................... 348/14.01–14.16; 370/259–271, 370/351–357, 259–271, 351–357; 709/201–207, 217–248; 455/403–466, 455/550.1–575.9, 90.1–90.3
See application file for complete search history.

(56) References Cited

U.S. PATENT DOCUMENTS

| | | | | |
|---|---|---|---|---|
| 5,598,209 | A * | 1/1997 | Cortjens et al. | 348/211.12 |
| 5,619,555 | A * | 4/1997 | Fenton et al. | 379/88.11 |
| 5,745,161 | A * | 4/1998 | Ito | 348/14.09 |
| 5,745,711 | A * | 4/1998 | Kitahara et al. | 715/759 |
| 6,016,478 | A * | 1/2000 | Zhang et al. | 705/7.19 |
| 6,266,082 | B1 * | 7/2001 | Yonezawa et al. | 348/159 |
| 6,466,252 | B1 | 10/2002 | Miyazaki | |
| 6,876,734 | B1 * | 4/2005 | Summers et al. | 379/202.01 |
| 7,046,779 | B2 * | 5/2006 | Hesse | 379/202.01 |
| 7,111,045 | B2 * | 9/2006 | Kato et al. | 709/205 |
| 7,324,463 | B2 * | 1/2008 | Takada et al. | 370/259 |
| 7,353,251 | B1 * | 4/2008 | Balakrishnan | 709/204 |
| 2002/0178270 | A1 | 11/2002 | Riordan | |
| 2003/0103075 | A1 * | 6/2003 | Rosselot | 345/717 |
| 2005/0015444 | A1 * | 1/2005 | Rambo | 709/204 |
| 2005/0099492 | A1 * | 5/2005 | Orr | 348/14.08 |
| 2006/0184624 | A1 * | 8/2006 | Thukral | 709/204 |
| 2006/0200518 | A1 * | 9/2006 | Sinclair et al. | 709/204 |
| 2007/0121530 | A1 * | 5/2007 | Vadlakonda et al. | 370/260 |
| 2007/0188596 | A1 * | 8/2007 | Kenoyer | 348/14.08 |
| 2010/0037151 | A1 * | 2/2010 | Ackerman et al. | 715/753 |
| 2010/0149302 | A1 | 6/2010 | Malik | |
| 2011/0072096 | A1 * | 3/2011 | Goldstein et al. | 709/206 |

* cited by examiner

*Primary Examiner* — Hemant Patel
(74) *Attorney, Agent, or Firm* — Wolfe-SBMC (57) ABSTRACT

A video conference invitation is sent from a computing device in a first conference room to a second conference room for a video conference. Further, an acceptance of the invitation is received at the computing device. In addition, a list of available devices for video conferencing is retrieved from a device information database. The list of available devices indicates a locally connected device and a remotely connected device. The computing device is connected to the video conference through a platform independent interface. Further, the computing device locally controls operation of the locally connected device through a platform independent interface during the video conference and remotely controls operation of the remotely connected device during the video conference.

15 Claims, 6 Drawing Sheets

DEVICE INFORMATION INDEX AND RETRIEVAL SERVICE FOR SCALABLE VIDEO CONFERENCING

BACKGROUND

1. Field

This disclosure generally relates to video conferencing. More particularly, the disclosure relates to scalable video conferencing.

2. General Background

Room-based video conferencing has grown as a means of encouraging collaborative work among offices spread around the globe. In particular, room-based video conferencing has provided a substitute for travel and has greatly helped reduce business related travel expenses. Room-based video conferencing attempts to provide users with the appearance of sitting on the opposite side of a conference table from one or more remote parties. Transmitting HD video images and audio helps provide such an appearance. However, users sometimes have a hard time utilizing video conferencing systems. As a result, users may often take up a significant portion of an allotted meeting time to address technical issues.

A significant difficulty with current room-based video conferencing mostly rests in inconsistencies between device interface and terminologies utilized by various vendors of the devices typically present at various locations in a video conference. Accordingly, some technical issues become quite difficult to solve without expert vendor assistance. Therefore, some users may forego the benefits of video conferencing, e.g., reduced travel time, cost, and carbon dioxide emission in favor of travelling to avoid having a meeting that is significantly hampered by technical issues.

SUMMARY

In one aspect of the disclosure, a computer program product is provided. The computer program product includes a computer useable medium having a computer readable program. The computer readable program when executed on a computer causes the computer to send, from a computing device in a first conference room, a video conference invitation to a second conference room for a video conference. Further, the computer readable program when executed on the computer causes the computer to receive, at the computing device, an acceptance of the invitation. In addition, the computer readable program when executed on the computer causes the computer to retrieve, from a device information database, a list of available devices for video conferencing. The list of available devices indicates a locally connected device and a remotely connected device. The computer readable program when executed on the computer causes the computer to connect, from the computing device, to the video conference through a platform independent interface. Further, the computer readable program when executed on the computer causes the computer to locally control, with the computing device, operation of the locally connected device through a platform independent interface during the video conference. In addition, the computer readable program when executed on the computer causes the computer to remotely control, with the computing device, operation of the remotely connected device during the video conference.

In another aspect of the disclosure, a process is provided. The process sends, from a computing device in a first conference room, a video conference invitation to a second conference room for a video conference. Further, the process receives, at the computing device, an acceptance of the invitation. In addition, the process retrieves, from a device information database, a list of available devices for video conferencing. The list of available devices indicates a locally connected device and a remotely connected device. The process also connects, from the computing device, to the video conference through a platform independent interface. Further, the process locally controls, with the computing device, operation of the locally connected device through a platform independent interface during the video conference. In addition, the process remotely controls, with the computing device, operation of the remotely connected device during the video conference.

In yet another aspect of the disclosure, a system is provided. The system includes a transmission module that sends, from a computing device in a first conference room, a video conference invitation to a second conference room for a video conference. Further, the system includes a reception module that receives, at the computing device, an acceptance of the invitation. In addition, the system includes a retrieval module that retrieves, from a device information database, a list of available devices for video conferencing. The list of available devices indicates a locally connected device and a remotely connected device. Further, the system includes a connection module that connects, from the computing device, to the video conference through a platform independent interface. In addition, the system includes a controller that locally controls, with the computing device, operation of the locally connected device through a platform independent interface during the video conference and remotely controls, with the computing device, operation of the remotely connected device during the video conference.

DRAWINGS

The above-mentioned features of the present disclosure will become more apparent with reference to the following description taken in conjunction with the accompanying drawings wherein like reference numerals denote like elements and in which:

FIG. 2A illustrates an initial configuration of the user interface.

FIG. 2B illustrates a configuration of the user interface that allows a user to select a registered conference room to invite to a video conference.

FIG. 2C illustrates a configuration of the user interface in which a user remotely controls devices in a video conference.

DETAILED DESCRIPTION

A device information index and retrieval system addresses technical problems in a video conferencing environment. The device information index and retrieval system includes device information database records and indexes available device information. Further, the device information index and retrieval system generates a list of available devices for each user and the available devices in a conference room in which he or she is planning to have a meeting. The device information index and retrieval system utilizes a common interface so that all devices participating in the video conference may be accessed via common terminology and receive consistent feedback in the event of any technical issues. Further, the common interface allows a host device present in one physical conference room to view and control devices in a remote conference room.

The device information index and retrieval system may retrieve device information for each conferencing room participating in the video conference and allows users to efficiently utilize multiple options of devices for video conferencing. Further, the device information index and retrieval system may allow users to understand the technical specifications about available conferencing devices. The users may then be able to obtain helpful information that may allow them to solve any technical difficulties with the devices by themselves rather than having to take what may take a long time in contacting vendors for technical assistance. In addition, developers may design and implement common interfaces for users to manage and control devices for video conferencing or other usage.

Also, the device information index and retrieval system may be utilized to solve interoperability difficulties amongst different device vendors. For example, the device information may be utilized to connect systems across a common interface. Further, that common interface may be utilized to solve compatibility issues for certain devices that may have technical difficulties performing well in a video conferencing environment. As examples, users of a low-end laptop, a tablet device, or a smart phone, can obtain better connectivity to users in a video conferencing environment with a high end video conferencing systems. In addition, the common interface may provide for secure connectivity to address privacy concerns when the devices connect and sync with computer and other equipment inventory management systems.

Figure 1:
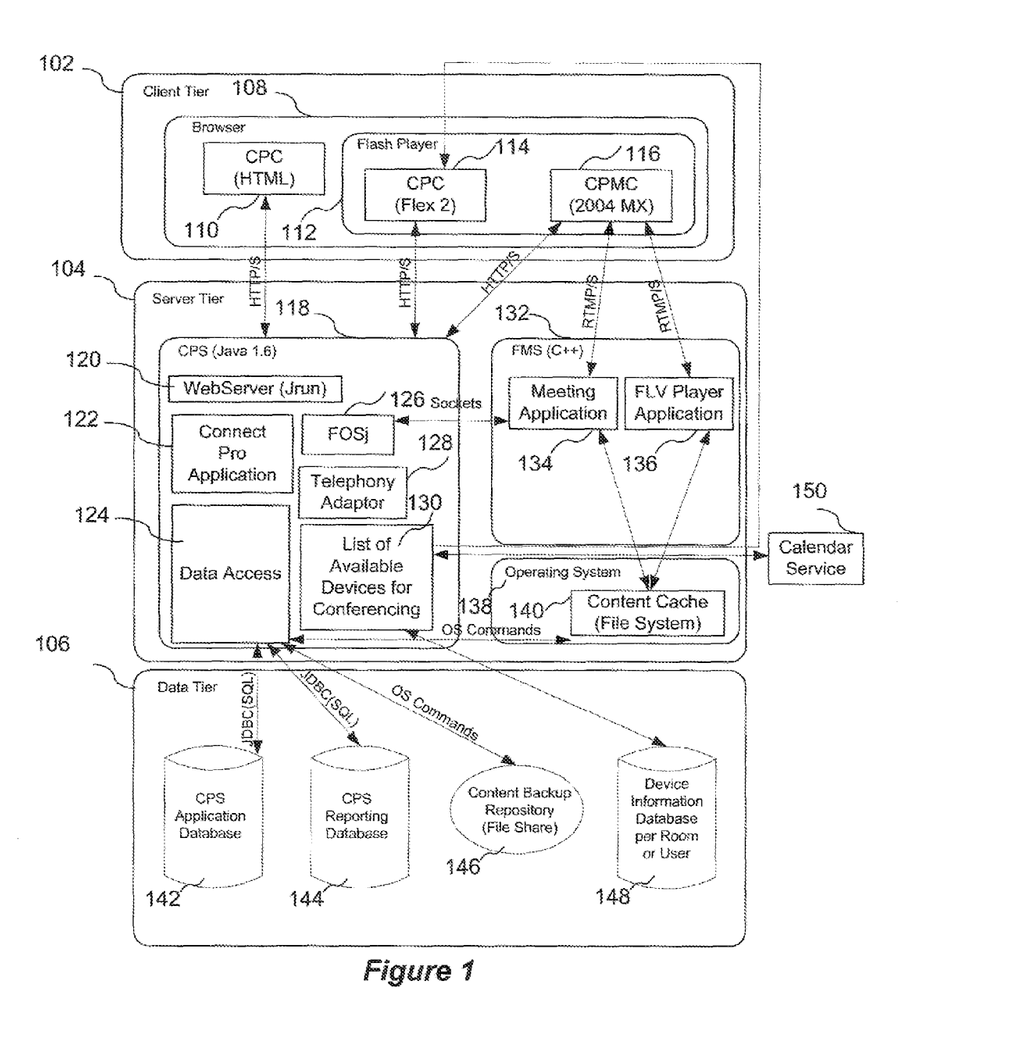
FIG. 1 illustrates a scalable video conferencing system.

FIG. 1 illustrates a scalable video conferencing system 100. The scalable video conferencing system 100 includes a client tier 102, a server tier 104, and a data tier 106. The client tier has a browser that includes a Connect Pro Client ("CPC") 110, and a flash player 112. The CPC is a browser-based client that calls a Connect Pro Server ("CPS") 118 via HTTP with request parameters encoded in URL or within an XML structure, e.g., a user login to build a session. The flash player has a CPC 114 and a Connect Pro Meeting Client ("CPMC") 116. The CPMC 116 launces a meeting client in a session. The meeting client may have a graphical user interface ("GUI") to connect other user's video/audio/presentation and also to another video conferencing system. The server tier 104 includes the CPS 118, a Flash Media Server ("FMS") 132, and an operating system ("OS") 138. The FMS 132 streams video and audio data to and from clients. Further, a meeting application may stream live video and audio data. The CPS 118 includes a webserver 120, a Connect Pro Application 122, a data access module 124, a Flash Communication Server Java SDK ("FOSj") module 126, a telephony adaptor 128, and a list of available devices for video conferencing 130. The data access module may communicate with the OS 138 via OS commands. The FOSj 126 provides an application programming interface ("API") such as Internet Sockets that lets applications connect to the communication server. Further, the FMS 132 includes a meeting application 134 and a Flash Video ("FLV") player application 136. The FLV player application 136 streams a previously recorded meeting on demand. The CPMC 116 may utilize Real Time Messaging Protocol ("RTMP") to communicate with the meeting application 134 and the FLV player 136. In addition, the OS 138 includes a content cache file system 140. The webserver 120 may utilize a servlet engine such as Jrun. The data tier includes a CPS database 142, a CPS reporting database 144, a content backup repository 146, and a device information database per room or user 148. The CPS database 142 and the CPS reporting database 144 may utilize Java Database Connectivity ("JDBC") and/or Standard Query Language ("SQL") to communicate with the data access module 124. Further, the content backup repository 146 may communicate OS commands with the data access module 124.

The device information database per room or user 148 records and indexes available device information such as specifications, configurations, and vendor names for each conferencing room. In an alternative embodiment, the scalable video conferencing system 100 may utilize an existing conferencing equipment or computer inventory database for an enterprise. Accordingly, the scalable video conferencing system 100 may be utilized with an existing database. However, enterprise users may still utilize the device information database per room or user 148 even if such enterprise users already have an existing database.

The scalable video conferencing system 100 also has a calendar service 150 to set up a meeting or reserve a conference room during a certain time. Based on the availability of the conference room, the calendar service 150 accepts or rejects the meeting invitation. When the calendar service accepts the meeting request for a certain time, the user will be given permission to utilize the room and also view and control the devices in the room. Therefore, information about conferencing devices in the room will be retrieved and presented for users whether they are inside or outside of the room, but only during the certain meeting reservation hours.

The list of available devices for video conferencing 130 retrieves audio/video/camera device information on users' systems via platform application program interfaces ("APIs") or operating system specific APIs. Further, the list of available devices for video conferencing 130 synchronizes the local device information with a server located at the server tier 104 and with the device information database per room or user 148.

To achieve scalable video conferencing, the conferencing application utilizes device information from the list of available devices for video conferencing 130 and the device information database per room or user 148, sends/receives device multimedia data, and populates high quality video and audio to users. Further, the conferencing application allows users to easily control and utilize those devices anywhere as far as they got permission through the calendar service 150.

In one embodiment, a device information and control service creates a list of available device information for each user in XML format. When a client sends the user name to the service, the service responds with the available device list information for the user to utilize for video conferencing. The list includes available devices in his or her local machine and also in the conference room he or she is planning to have a meeting. The device information and control service may handle control request and response for certain devices that can process control messages. For example, when the client sends a message of "video camera turn on" to the device information and control service, the device information and control service processes the request on the device and responds to the client with a success or fail message to communicate whether or not the device information and control service has successfully performed.

Figure 2A:
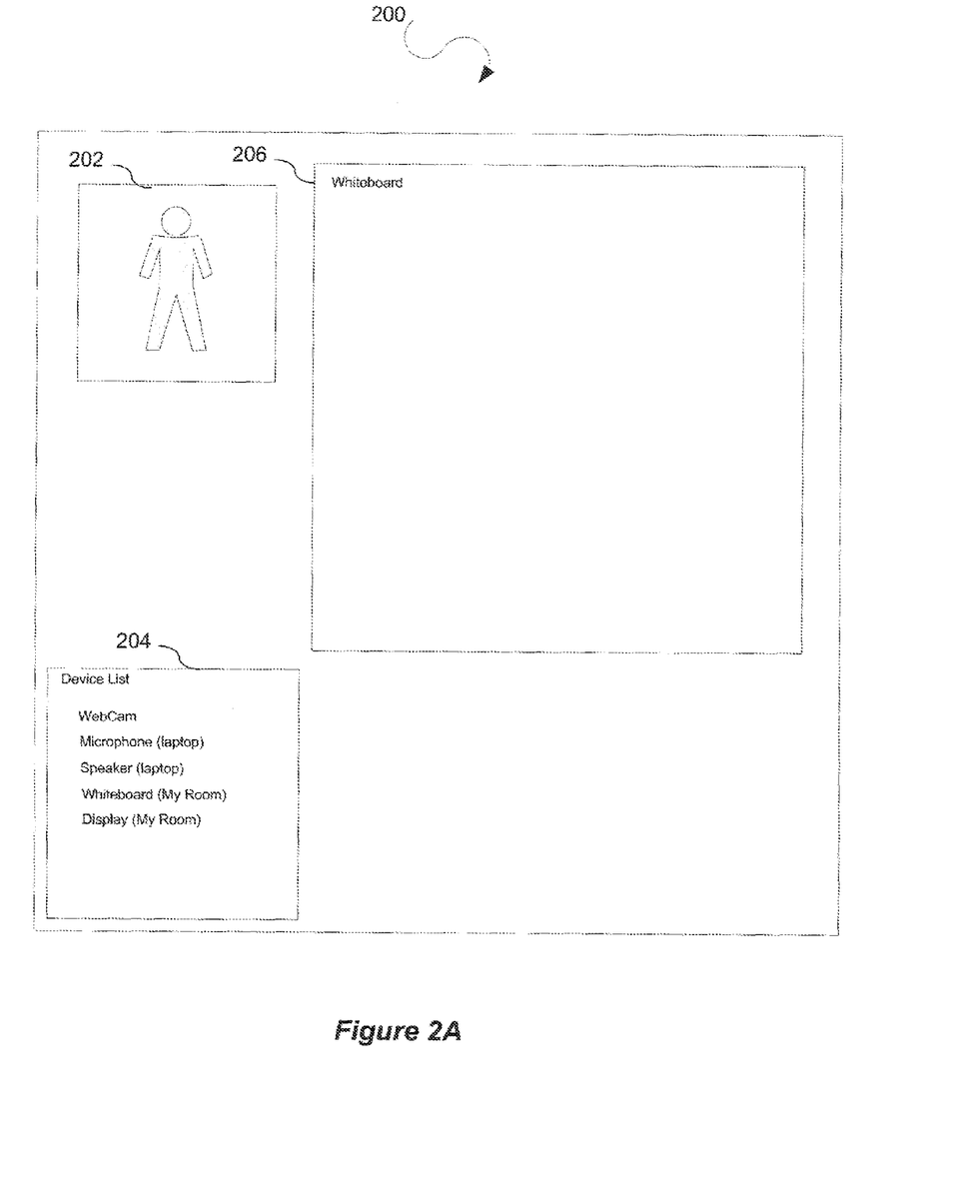
FIGS. 2A-2C illustrates a user interface that may be utilized for a host user to both locally and remotely control devices available in a plurality of conference rooms.
Figure 2B:
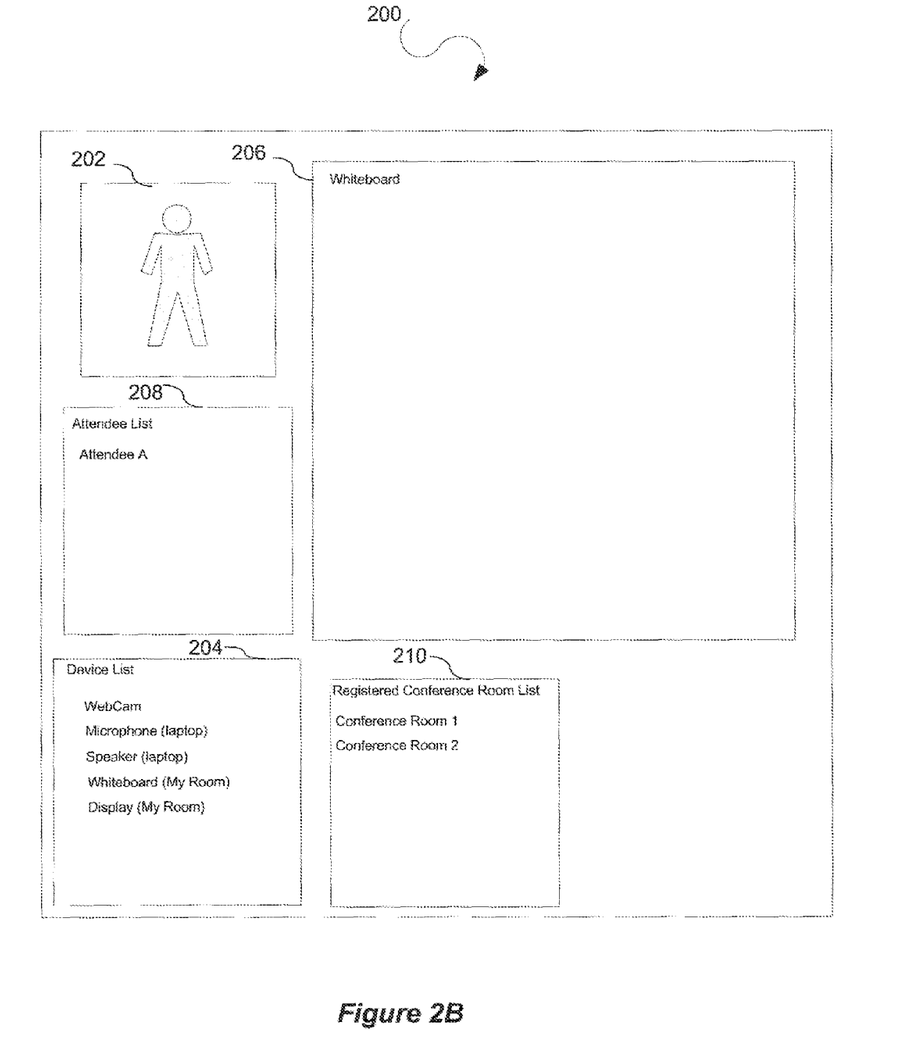
Figure 2C:
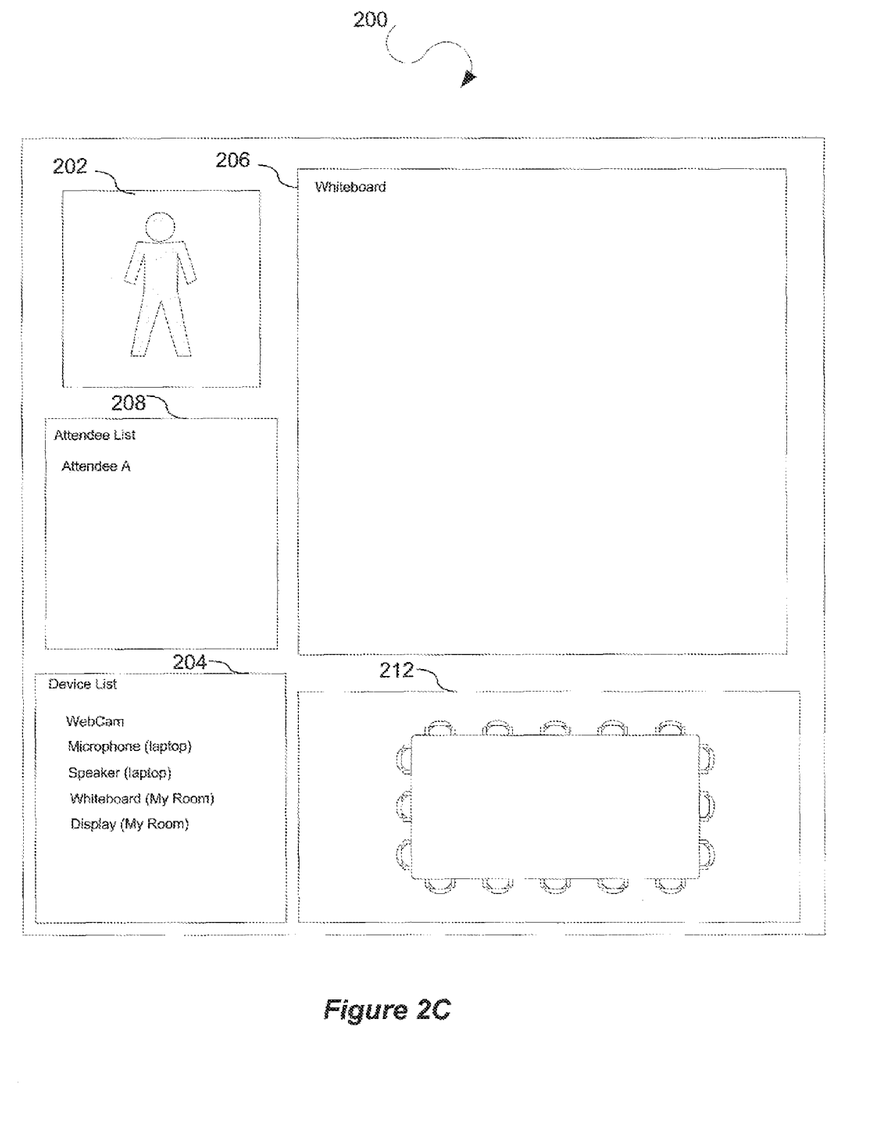

FIGS. 2A-2C illustrates a user interface 200 that may be utilized for a host user to both locally and remotely control devices available in a plurality of conference rooms. FIG. 2A illustrates an initial configuration of the user interface 200. A user display 202 is illustrated. As an example, a webcam may be utilized to display live video of the user in front of a device. Further, a device list 204 lists local devices of which a user may have control. For example, the device list 204 may have a webcam, a microphone, a speaker, a whiteboard, and a display. Further, the user interface may be utilized by the user to interact with any of the devices on the display list 204. As an example, a whiteboard window 206 is displayed to indicate that the user is interacting with the whiteboard from the device list 204. The devices in the device list 204 may be detected automatically through platform APIs or OS specific APIs.

FIG. 2B illustrates a configuration of the user interface 200 that allows a user to select a registered conference room to invite to a video conference. The user interface 200 illustrates an attendee list 208 with a current list of attendees and a registered conference room list 210. The attendee list 208 may initially have the host listed as the attendee. Other attendees may be added to the attendee list as the attendees connect to the video conference. Further, the registered conference room list 210 may list available conference rooms to which the host may connect. For example, the registered conference room list 210 may have a first conference room and a second conference room available for selection.

FIG. 2C illustrates a configuration of the user interface 200 in which a user remotely controls devices in a video conference. As an example, the user may have invited the first conference room as illustrated in FIG. 2B. After the first conference room accepts the conference invitation, a conference room webcam 212 may display a video feed of the second conference room in the second conference room webcam 212.

Figure 3:
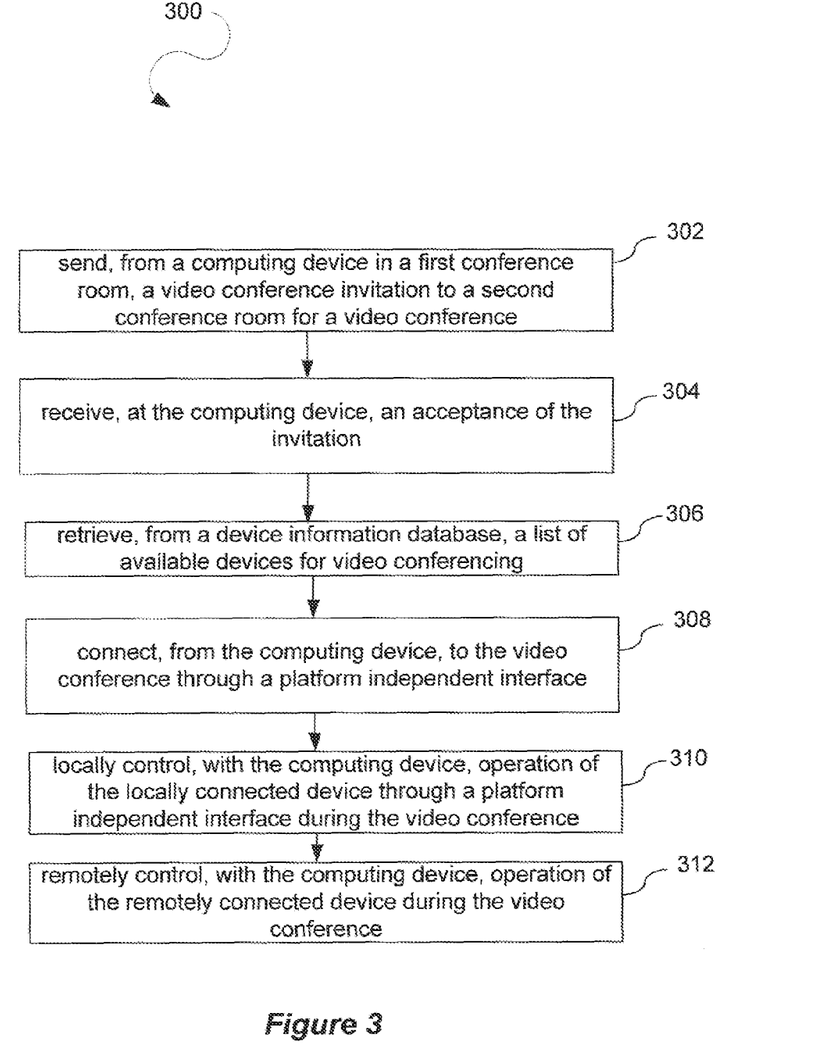
FIG. 3 illustrates a process that may be utilized to provide scalable video conferencing.

FIG. 3 illustrates a process 300 that may be utilized to provide scalable video conferencing. At a process block 302, the process 300 sends, from a computing device in a first conference room, a video conference invitation to a second conference room for a video conference. Further, at a process block 304, the process 300 receives, at the computing device, an acceptance of the invitation. In addition, at a process block 306, the process 300 retrieves, from a device information database, a list of available devices for video conferencing. The list of available devices indicates a locally connected device and a remotely connected device. At a process block 308, the process 300 also connects, from the computing device, to the video conference through a platform independent interface. Further, at a process block 310, the process 300 locally controls, with the computing device, operation of the locally connected device through a platform independent interface during the video conference. In addition, at a process block 312, the process 300 remotely controls, with the computing device, operation of the remotely connected device during the video conference.

Figure 4:
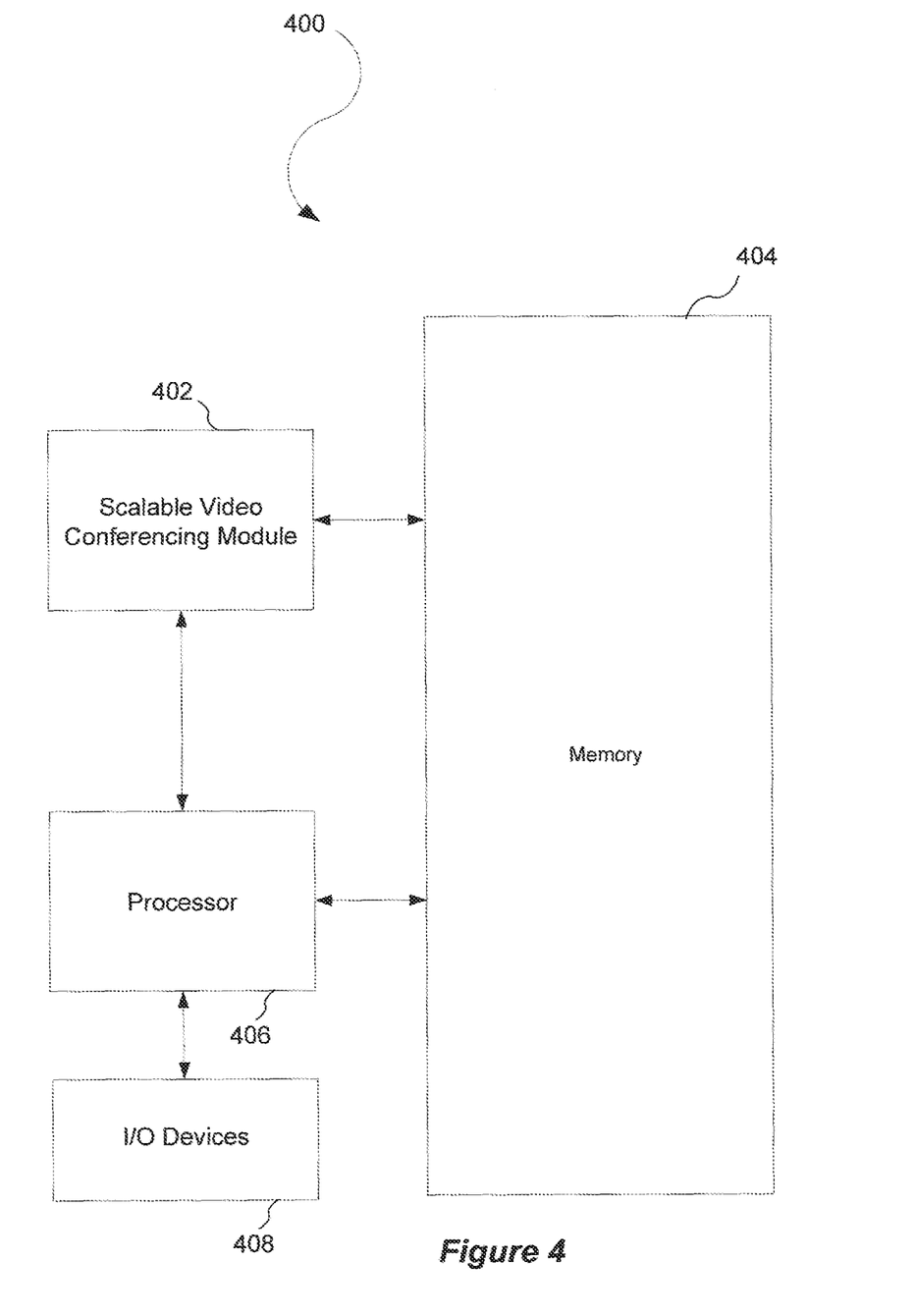
FIG. 4 illustrates a system configuration that may be utilized for scalable video conferencing.

FIG. 4 illustrates a system configuration 400 that may be utilized for scalable video conferencing. In one embodiment, a scalable video conferencing module 402 interacts with a memory 404. In one embodiment, the system configuration 400 is suitable for storing and/or executing program code and is implemented using a general purpose computer or any other hardware equivalents. The processor 406 is coupled, either directly or indirectly, to the memory 404 through a system bus. The memory 404 can include local memory employed during actual execution of the program code, bulk storage, and/or cache memories which provide temporary storage of at least some program code in order to reduce the number of times code must be retrieved from bulk storage during execution.

The Input/Output ("I/O") devices 408 can be coupled directly to the system configuration 400 or through intervening input/output controllers. Further, the I/O devices 408 may include a keyboard, a keypad, a mouse, a microphone for capturing speech commands, a pointing device, and other user input devices that will be recognized by one of ordinary skill in the art. Further, the I/O devices 408 may include output devices such as a printer, display screen, or the like. Further, the I/O devices 408 may include a receiver, transmitter, speaker, display, image capture sensor, biometric sensor, etc. In addition, the I/O devices 408 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 400 to enable the system configuration 400 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer program product comprising a computer readable memory having a computer readable program, wherein the computer readable program when executed on a computer causes the computer to:
  send, from a computing device in a first conference room, a video conference invitation from a calendar service to a second conference room for a video conference;
  receive, at the computing device, an acceptance of the invitation;

retrieve, from a device information database, a list of available devices for video conferencing, the list of available devices indicating a locally connected device and a remotely connected device;
receive, at the computing device, from the device information database, information to assist a user in solving technical difficulties with the locally or remotely connected devices;
get, at the computing device, permission from the calendar service to control and utilize at least one of the locally connected or remotely connected device;
connect, from the computing device, to the video conference through a platform independent interface;
locally control, with the computing device, operation of the locally connected device through a platform independent interface during the video conference; and
remotely control, with the computing device, operation of the remotely connected device during the video conference.

2. The computer program product of claim 1, wherein the device information database stores a locally connected device technical specification for the locally connected device and a remotely connected device specification for the remotely connected device.

3. The computer program product of claim 1, wherein the device information database stores a locally connected device vendor name for the locally connected device and a remotely connected vendor name for the remotely connected device.

4. The computer program product of claim 1, wherein the computer readable program when executed on the computer further causes the computer to view the remotely connected device from the computing device.

5. The computer program product of claim 1, wherein the platform independent interface is based on an application programming interface.

6. The computer program product of claim 1, wherein the computer readable program when executed on the computer further causes the computer to generate a list of available devices that includes device information associated with the locally connected device and the remotely connected device.

7. A method comprising:
sending, from a computing device in a first conference room, a video conference invitation from a calendar service to a second conference room for a video conference;
receiving, at the computing device, an acceptance of the invitation;
retrieving, from a device information database, a list of available devices for video conferencing, the list of available devices indicating a locally connected device and a remotely connected device;
receiving, at the computing device, from the device information database, information to assist a user in solving technical difficulties with the locally or remotely connected devices;
getting, at the computing device, permission from the calendar service to control and utilize at least one of the locally connected or remotely connected device;
connecting, from the computing device, to the video conference through a platform independent interface;
locally controlling, with the computing device, operation of the locally connected device through a platform independent interface during the video conference; and
remotely controlling, with the computing device, operation of the remotely connected device during the video conference.

8. The method of claim 7, wherein the device information database stores a locally connected device technical specification for the locally connected device and a remotely connected device specification for the remotely connected device.

9. The method of claim 7, wherein the device information database stores a locally connected device vendor name for the locally connected device and a remotely connected vendor name for the remotely connected device.

10. The method of claim 7, wherein the platform independent interface is based on an application programming interface.

11. The method of claim 7, further comprising generating a list of available devices that includes device information associated with the locally connected device and the remotely connected device.

12. A system comprising:
a calendar service module;
a transmission module that sends, from a computing device in a first conference room, a video conference invitation from the calendar service module to a second conference room for a video conference;
a reception module that receives, at the computing device, an acceptance of the invitation and permission from the calendar service module to control and utilize at least one device;
a retrieval module that retrieves, from a device information database, a list of available devices for video conferencing, the list of available devices indicating a locally connected device and a remotely connected device;
an information reception module that receives, at the computing device, from the device information database, information to assist a user in solving technical difficulties with the locally or remotely connected devices;
a connection module that connects, from the computing device, to the video conference through a platform independent interface; and
a controller that locally controls, with the computing device, operation of the locally connected device through a platform independent interface during the video conference and remotely controls, with the computing device, operation of the remotely connected device during the video conference.

13. The system of claim 12, wherein the device information database stores a locally connected device technical specification for the locally connected device and a remotely connected device specification for the remotely connected device.

14. The system of claim 12, wherein the device information database stores a locally connected device vendor name for the locally connected device and a remotely connected vendor name for the remotely connected device.

15. The system of claim 13, wherein the computing device views the remotely connected device.

* * * * *